(12) United States Patent
Kemmerer et al.

(10) Patent No.: US 6,983,052 B2
(45) Date of Patent: Jan. 3, 2006

(54) VEHICLE POWER AMPLIFIER AND VOLTAGE SUPPLY THEREOF

(75) Inventors: Jason Kemmerer, Thousand Oaks, CA (US); Michinao Asano, Tokyo (JP); Katsuhisa Shimizu, Iwaki (JP)

(73) Assignee: Alpine Electronics, Inc, Tokyo (JP)

( * ) Notice: Subject to any disclaimer, the term of this patent is extended or adjusted under 35 U.S.C. 154(b) by 694 days.

(21) Appl. No.: 10/036,776

(22) Filed: Dec. 29, 2001

(65) Prior Publication Data

US 2003/0123678 A1 Jul. 3, 2003

(51) Int. Cl.
*H04B 1/00* (2006.01)

(52) U.S. Cl. .......................................... 381/86; 381/120
(58) Field of Classification Search .................... 381/86, 381/120
See application file for complete search history.

(56) References Cited

U.S. PATENT DOCUMENTS

| 5,581,626 A | 12/1996 | Palmer |
| 5,737,427 A | 4/1998 | Ambourn |
| 6,181,796 B1 | 1/2001 | Johnson |

*Primary Examiner*—Brian T. Pendleton
(74) *Attorney, Agent, or Firm*—Muramatsu & Associates

(57) ABSTRACT

A voltage supply for a vehicle power amplifier having an audio property compensation function. The voltage supply includes means for setting the voltage supply to a first mode when its power is turned on, means for setting the voltage supply to a second mode when its power is tuned on after setting on/off operation of compensation functions and associated adjustment values in the first mode and turning the power off, and a memory for storing information that determines either the first mode or the second mode when the device power is turned on. The first mode is to supply voltage only to a unit for setting the compensation functions and values, and the second mode is to supply power to the entire vehicle power amplifier.

9 Claims, 8 Drawing Sheets

FIG. 4

| MODE | | FUNCTION | |
|---|---|---|---|
| DISPLAY | CONTENT | DISPLAY | CONTENT |
| 1 | INPUT MODE | 1-1 | SELECT |
| | | 1-2 | GAIN |
| 2 | LPF | 2-1 | ON/OFF |
| | | 2-2 | FREQUENCY |
| 3 | SUBSONIC | 3-1 | ON/OFF |
| | | 3-2 | FREQUENCY |
| 4 | PARAMETRIC EQ | 4-1 | ON/OFF |
| | | 4-2 | FREQUENCY |
| | | 4-3 | WIDTH |
| | | 4-4 | LEVEL |
| 5 | BASS COMP. | 5-1 | ON/OFF |
| 6 | TIME CORR. | 6-1 | ON/OFF |
| | | 6-2 | DELAY TIME |
| 7 | PHASE | 7-1 | 0/180 |
| 8 | AMP ID No. | 8-1 | AMP ID No. |
| | | 8-2 | TURN ON DELAY |
| 9 | SAFE MODE | 9-1 | ON/OFF |
| 0 | MEMORY | 0-1 | WRITE |
| | | 0-2 | READ |

VEHICLE POWER AMPLIFIER AND VOLTAGE SUPPLY THEREOF

FIELD OF THE INVENTION

This invention relates to a power amplifier and power supply for vehicles, and more particularly, to a vehicle power amplifier having an audio characteristics compensation function and a voltage supply for supplying source voltages to the vehicle power amplifier.

BACKGROUND OF THE INVENTION

In an audio system for vehicles, for reinforcing lower band (buss) sounds, a subwoofer will be additionally installed on a tray or trunk of a vehicle. FIG. 7 shows an example of vehicle audio system how the speakers are arranged in a sedan type vehicle. Four full range speakers $S_1$–$S_4$ are installed on the left and right doors in the front and rear, respectively, and a speaker $S_5$ for lower band reproduction is mounted on a trunk as a subwoofer. In an RV (recreational vehicle) or minivan type vehicle, the lower band reproduction speaker $S_5$ will be established at the back end of the luggage compartment.

Since it is a high power loudspeaker, a separate amplifier is required for driving the subwoofer. In many cases, such a power amplifier for driving the subwoofer includes, in addition to the amplifier unit, functions of a parametric equalizer and a filter for compensating or correcting the sound property unique to the vehicle. Traditionally, settings and adjustment of such functions are conducted with the use of analog electrical components ALP, such as rotary volumes, capacitors, switches, etc., provided at a side surface SD of the power amplifier such as shown in the external view of FIG. 8.

With the recent advancement in the digital signal technology and the cost reduction in the digital components, the settings and adjustment of various correction functions in such vehicle power amplifiers can be fulfilled by using the digital signal technology. With use of the digital technology, the performance and functions can be improved as well as such functions can be achieved at lower cost. However, complications will arise in the coarse adjustment of the vehicle power amplifier prior to the installment in a vehicle, which was easy in the case of using the analog circuit technology.

Namely, when installing such a vehicle power amplifier having sound property compensation functions in a vehicle, the setting made by the manufacturer before the shipment will not be an optimal setting for the vehicle. In a worst case scenario, an extremely high sound volume can be reproduced when the power is turned on due to an unpredictable setting value, which may damage other components or devices as well as harm people inside the vehicle. Therefore, to avoid such a problem, when a power amplifier is sold at a store or the like, an installer has to set and adjust (coarse adjustment) the various compensation functions in the vehicle power amplifier in conjunction with the specific type of vehicle or the particular audio system in the vehicle prior to the installment.

However, due to the digital signal technology, this coarse adjustment becomes difficult because such adjustment is not visually observable. Namely, in the analog circuit, the default values set in the power amplifier can be confirmed by visual inspection prior to the installment. In contrast, when using the digital signal technology, this default values in the amplifier cannot be confirmed unless connected to a power source.

Thus, in one approach, before installing in a vehicle, various functions of the power amplifier can be set and adjusted by connecting the power amplifier to a power source of a small power capacity. However, since the power consumption in the amplifier unit is high, such a power source of small power capacity cannot accommodate the required power level, which in turn may damage the power source.

Japanese Utility Model Publication No. Hei 5-37532 published Sep. 22, 1993, discloses a sound volume adjustment circuit using electronics volume developed for audio equipment. The sound volume adjustment circuit includes a main power source for supplying an electric power to the entire equipment, a sub-power source for supplying an electric power to a sound level controller and a display, and a mode setting means for establishing a standby mode for supplying electric power to the sound level controller and display through the sub-power source.

In this arrangement, a user sets the standby mode and adjusts the sound level of the electronics volume with use of the sound level controller and the display while visually monitoring the sound level. Such change-over to the standby mode is made by operating a remote control switch established on a remote controller or a standby switch established on a receiver. According to this conventional technology, the power consumption during the sound adjustment process can be reduced, thus, allowing to adjust the sound volume by simply connecting the amplifier to a small capacity power source.

Similar to such a conventional technology in the audio equipment noted above, a vehicle power amplifier can also be adjusted their various compensation functions with use of a sound volume adjustment circuit before installing in a vehicle. However, in this conventional technology, the mode can easily be switched to the standby mode or other modes by operating the remote control switch or the standby switch. Thus, in the case when the adjustment circuit is not in the standby mode when the power amplifier is turned on, a large amount of power will be consumed, which may damage the small capacity power source.

In addition, if, the power amplifier is installed in the vehicle without the sound volume adjustment such as by an error, and the power is turned on, an extremely high volume sound may be reproduced because the power amplifier is in unpredictable settings, which in turn may damage the devices as well as harm the people inside the vehicle.

SUMMARY OF THE INVENTION

Therefore, it is an object of the present invention to provide a vehicle power amplifier which is capable of adjusting various compensation functions upon connecting the power amplifier to a power source of small capacity while preventing the power from being supplied to the entire power amplifier during the adjustment.

It is another object of the present invention to provide a vehicle power amplifier which is capable of supplying the power source to the entire power amplifier only when the power is turned on after the completion of the adjustment of the various compensation functions.

It is a further object of the present invention to provide a vehicle power amplifier having a first mode for supplying power only to an adjustment circuit and a display (SAFE MODE ON) and a second mode for supplying the power to the entire power amplifier (SAFE MODE OFF), thereby adjusting the various compensation parameters of the power amplifier safely and accurately in the first mode.

In one aspect of the present invention, a voltage supply for a vehicle power amplifier includes means for setting the voltage supply to a first mode when its power is turned on, and means for setting the voltage supply to a second mode when its power is tuned on after setting on/off operation of compensation functions and associated adjustment values in the first mode and turning the power off, wherein the first mode is to supply voltage only to a unit for setting the compensation functions and values, and the second mode is to supply power to the entire vehicle amplifier.

In another aspect of the present invention, a vehicle power amplifier includes a memory for storing information which specifies either a first mode or a second mode at power on, means for storing the information indicating the first mode in the memory at an initial phase, a voltage supply for supplying source voltages to blocks in the power amplifier based on the information stored in the memory; and means for setting on/off operation of compensation functions and associated adjustment values in the first mode and storing the information indicating the second mode in the memory, and means for applying a compensation process to audio signals based on the settings and amplifying the audio signals by a power amplifier unit in the second mode, wherein the first mode is to supply voltage only to a unit for setting the compensation functions and the values, and the second mode is to supply power to the entire vehicle amplifier.

Other features and advantages of the present invention will be apparent from the following description taken in conjunction with the accompanying drawings.

BRIEF DESCRIPTION OF THE DRAWINGS

FIG. 4 is a data table explaining the modes and functions in the various compensation functions in the automobile power amplifier of the present invention.

DETAILED DESCRIPTION OF THE INVENTION

Figure 1:
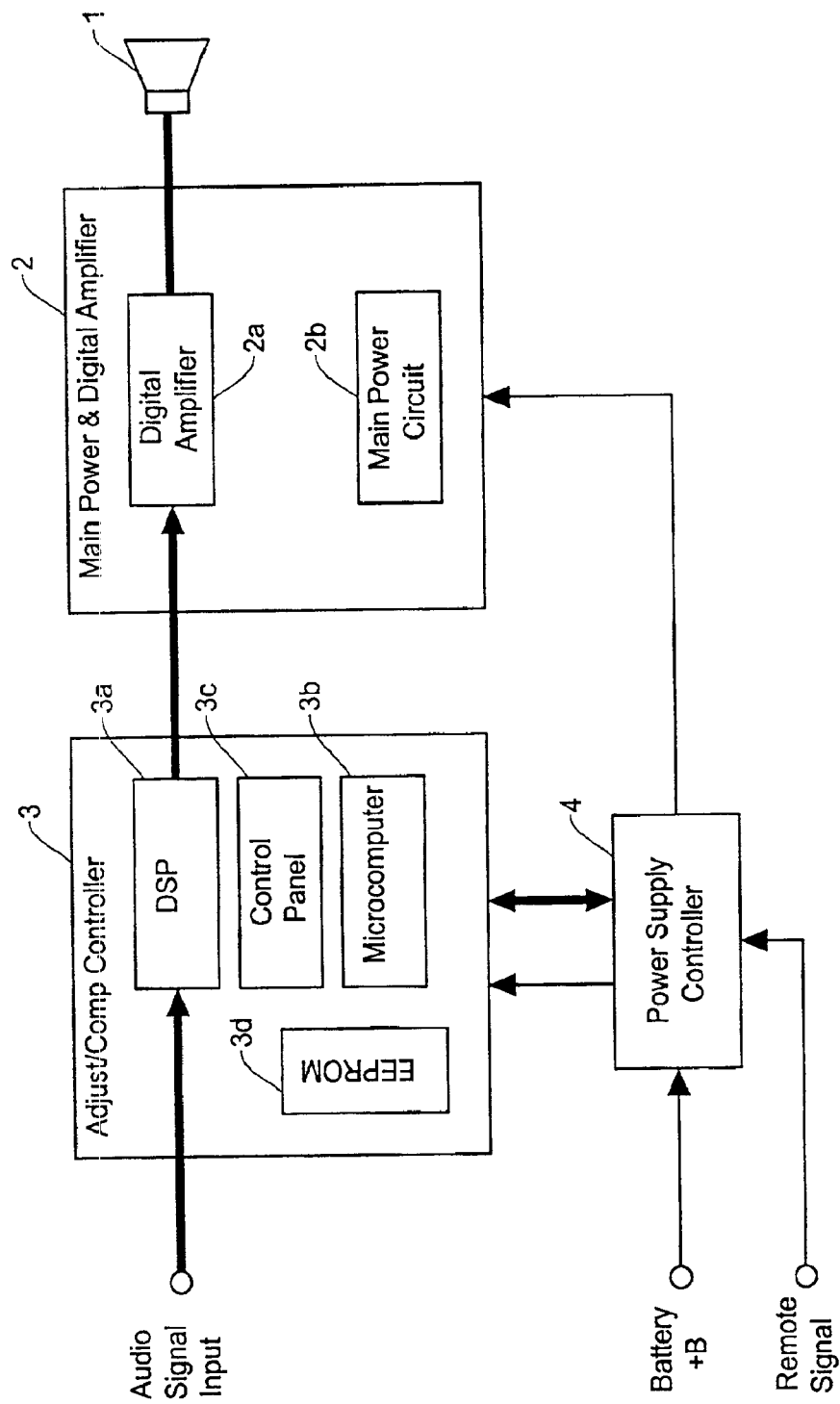
FIG. 1 is a schematic diagram showing an example of structure in the vehicle power amplifier in accordance with the present invention.

FIG. 1 is a schematic diagram showing a basic configuration of the vehicle power amplifier of the present invention. The power amplifier of FIG. 1 comprises a subwoofer 1, a main power source and digital amplifier 2, an adjustment and compensation controller 3, and a power supply controller 4.

The main power source and digital amplifier 2 includes a digital amplifier (amplifier unit) 2a for supplying amplified audio signals to the subwoofer 1 and a main power source circuit 2b for supplying a DC voltage to the digital amplifier 2a. The adjustment and compensation controller 3 sets on/off operations of the various audio compensation functions and associated adjustment values as well as controls the audio compensation operation. The adjustment and compensation controller 3 comprises a digital signal processor (DSP) 3a, a microcomputer 3b, a control panel 3c, and a memory such as an EEPROM (Electrically Erasable Programmable Read Only Memory) 3d. The power supply controller 4 supplies source voltage to the main power source and digital amplifier 2 and the adjustment and compensation controller 3.

The automobile power amplifier of the present invention operates either in a first mode or a second mode. The first mode is to supply the source voltage only to the adjustment and compensation controller 3 and not to the digital amplifier 2a. The second mode is to supply the source voltage to the entire power amplifier.

At the initial phase, the information for setting the vehicle power amplifier in the first mode is stored in the EEPROM 3d. Under this condition, the power source of small capacity is connected to vehicle power amplifier through a battery terminal +B, and a remote signal is supplied to a remote signal terminal. When the remote signal and the power source are respectively supplied, the adjustment and compensation controller 3 sets the power amplifier in the first mode based on the information stored in the EEPROM 3d. In the first mode, the power supply controller 4 supplies the source voltage only to the adjustment and compensation controller 3, but not to the main power source and digital amplifier 2. During the first mode, current consumption is, for example, less than 100 mA and power consumption is, for example, less than 1 W.

In the first mode, the adjustment and compensation controller 3 sets the on/off operations and adjustment values of the various compensation functions. Upon completion of the adjustment and compensation, the information to set the vehicle power amplifier in the second mode is stored in the EEPROM 3d. After turning the power off and disconnected from the small capacity power source, the vehicle power amplifier is installed in a vehicle.

Under this condition, when the user turns the power amplifier on, the adjustment and compensation controller 3 sets the vehicle power amplifier to the second mode based on the information stored in the EEPROM 3d. Thus, the power supply controller 4 supplies source voltage to the entire power amplifier, i.e., to the digital amplifier 2a in the main power source and digital amplifier 2 and the adjustment and compensation controller 3. Accordingly, the DSP 3a in the adjustment and compensation controller 3 conducts audio property compensation control based on the set values of the various compensation functions, and the digital amplifier 2a amplifies the audio signals which are supplied to the subwoofer 1.

In the second mode, when there is no input signal, an example of current consumption is about 1A, and the power consumption is about 10 W. When amplifying an input signal, the power consumption of the vehicle power amplifier at maximum signal input is, for example, about 430 W.

Figure 2:
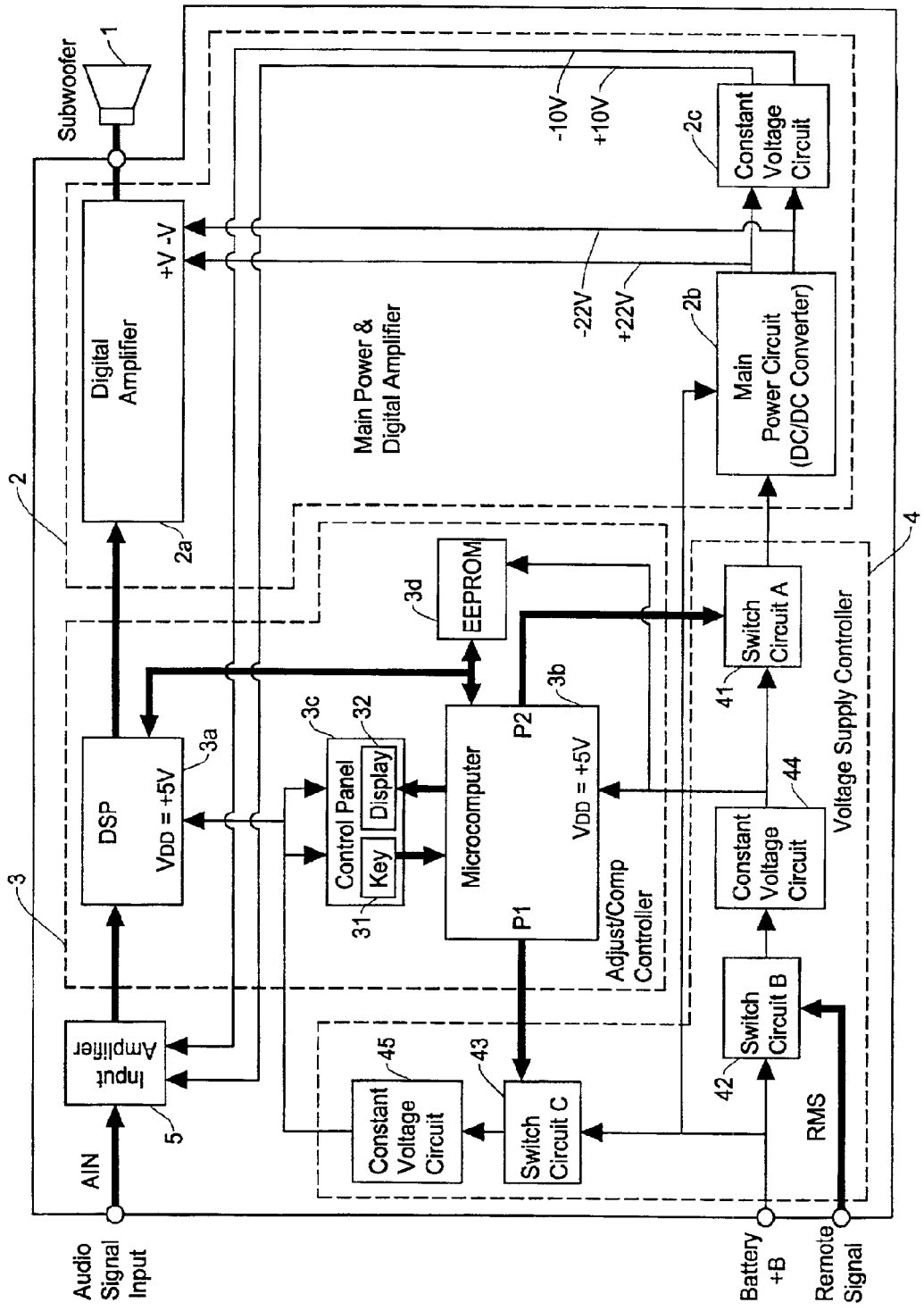
FIG. 2 is a block diagram showing a more detailed structure of the vehicle power amplifier of the present invention.

FIG. 2 is a block diagram showing more details of structure in the vehicle power amplifier of the present invention. In FIG. 2, the same components as shown in FIG. 1 are denoted with the same reference numbers. The difference between FIG. 1 and FIG. 2 is that the example of FIG. 2 further shows (1) an input amplifier 5 for amplifying input audio signals, (2) that a control panel 3c is configured by a key 31 and a display 32, (3) a more detailed structure of the voltage (power) supply controller 4, and (4) more details of power lines and signal lines.

In FIG. 2, the thick lines denote signal lines while the thin lines denote power lines. As noted above, the first mode is to supply the source voltage to the adjustment and compensation controller 3 but not to the digital amplifier (power amplifier unit) 2a, and the second mode is to supply the source voltage to the entire automobile power amplifier.

The voltage (power) supply controller 4 is comprised of switch circuits 41–43 and constant voltage circuits 44–45. The switch circuit 42 is turned on when the power is provided at the terminal +B and the remote signal RMS goes to a high level. The switch circuit 43 is turned on both in the first mode and second mode. The switch circuit 41 is turned off in the first mode and turned on in the second mode.

When the switch circuit 42 is turned on, it activates the constant voltage circuit 44 to supply a DC voltage 5V to the microcomputer 3b and the EEPROM 3d. When the switch circuit 43 is turned on, it activates the constant voltage circuit 45 to supply a DC voltage 5V to the DSP 3a and the control panel 3c. When the switch circuit 41 is turned on, it activates the main power circuit 2b forming a DC—DC converter, thereby generating a DC voltage ±22V with use of the battery power and supplying the DC voltage to the digital amplifier 2a and the constant voltage circuit 2c. The constant voltage circuit 2c then generates a DC voltage ±10V and supplies the DC voltage to the input amplifier 5.

As noted above, the adjustment and compensation controller 3 is comprised of the DSP 3a, the microcomputer 3b, the control panel 3c, and the EEPROM 3d. Based on the values set for the various compensation functions, the DSP 3a conducts predetermined signal processing (such functions as parametric equalization, low pass filter, subsonic filter, and delay) on the input audio signal and supplies the resultant audio signal to the digital amplifier (power amplifier unit) 2. The digital amplifier 2 amplifies the audio signals which is supplied to the subwoofer (speaker) 1 through the output terminal.

In the initial setting at the shipment from the manufacturer, the microcomputer 3b confirms that nothing is written in the EEPROM 3d, and sets all functions to default settings as well as writes the information to determine the first mode (SAFE MODE ON) in the EEPROM 3d as an initial mode when the power amplifier is turned on. The microcomputer 3b also controls the setting and adjustment of the various functions and writes the set values in the EEPROM 3d. Further, the microcomputer 3b supplies the on/off settings of the various compensation functions and the adjustment values in the compensation functions to the DSP 3a so that the DSP 3a is able to control the compensation operations in response to such settings and values.

Figure 3A:
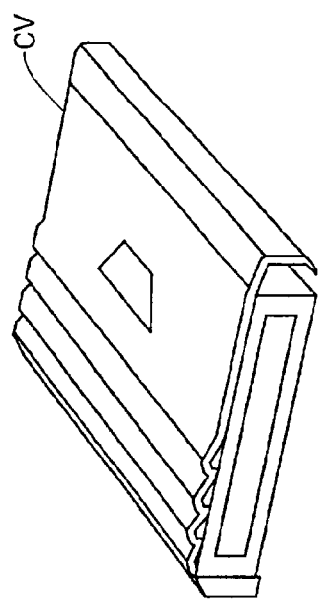
FIG. 3A is a perspective view of the vehicle power amplifier of the present invention and FIG. 3B is a diagram showing an example of control panel of the vehicle power amplifier of FIG. 3A.
Figure 3B:
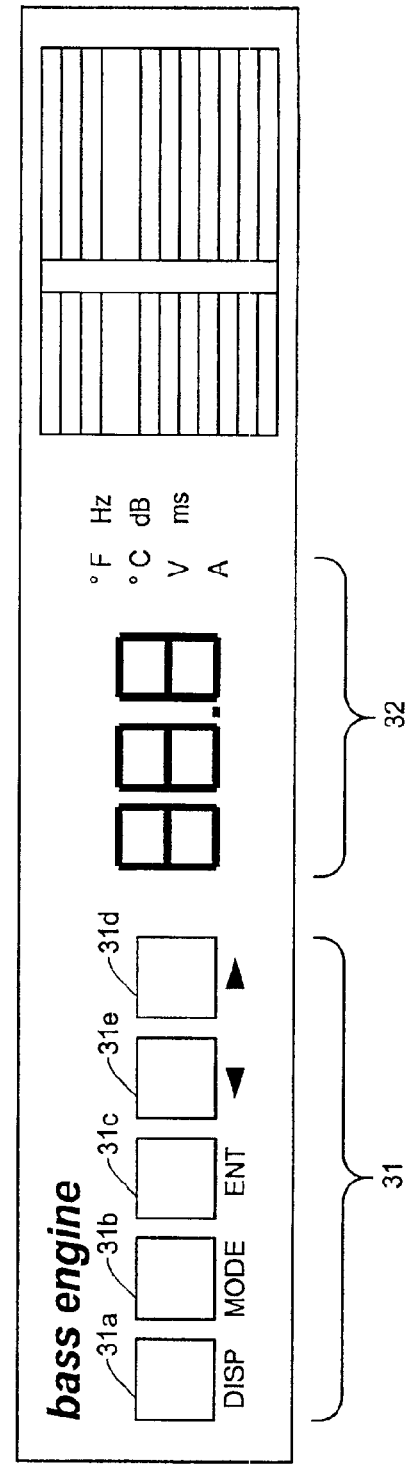

The control panel 3c displays parameters such as voltage, current, temperature (Celsius, Fahrenheit) and etc., and interfaces between the user and the power amplifier for setting the parameters such as on/off of the various compensation functions and associated adjustment values. FIG. 3A is a perspective view of the vehicle power amplifier of the present invention, and FIG. 3B is a front view of the control panel 3c. When the cover CV on the top of the vehicle power amplifier is opened, the control panel 3c shown in FIG. 3B appears, allowing the user to control various settings. The key 31 is comprised of a display key (DISP) 31a, a mode key (MODE) 31b, an enter key (ENT) 31c, an up key 31d, and a down key 31e. By using these keys, the on/off operation of the various compensation functions and the adjustment values for the selected compensation functions can be set.

Example of compensation function (compensation modes) in the vehicle power amplifier of the preset invention is listed in the table of FIG. 4. This example includes 10 compensation modes, i.e., from mode 0 to mode 9, where each mode can be provided with 1–4 functions. Each mode of compensation function is briefly explained below.

1. INPUT MODE: This mode is to adjust the amplifier characteristics involving audio input channels. It includes two functions, where the first function sets the switch of the input between left channel (Lch) and right channel (Rch) or left and right channel (Lch+Rch), and the second function sets the gain.

2. LPF: This mode is to adjust the amplifier characteristics involving the low pass filter (LPF). It has two functions, where the first function sets the on/off of the low pass filter, and the second function sets the upper limit frequency of the low pass filter.

3. SUBSONIC: This mode is to adjust the amplifier characteristics involving the subsonic filter (high pass filter). It has two functions, where the first function sets the on/off of the subsonic filter, and the second function sets the lower limit frequency of the subsonic filter.

4. PARAMETRIC EQ: This mode is to adjust the amplifier characteristics involving the parametric equalizer. It has four functions, where the first function sets the on/off of the parametric equalizer, and the remaining functions (second, third, and fourth) respectively set the center frequency, bandwidth (Q), and level of the equalizer. By freely adjusting and setting the frequency, bandwidth (Q), and level of the equalizer, a specified sound width can be accurately adjusted as desired. Thus, it can easily and efficiently perform the correction of sound disturbance (peak, dip) involved in the specific structure of the vehicle and the elimination of low muffled sounds involved in the sound characteristics of the vehicle. Further, even the very low frequency band can be finely controlled to produce natural balance and preferable sound.

5. BASS COMPRESSION: This is a mode for turning a predetermined tone adjusting function on and off.

6. TIME CORRECTION: This mode is to adjust the amplifier characteristics involving the delay times. It has two functions, where the first function sets the on/off of the time correction (delay time setting) function, and the second function sets the delay time. This compensation mode is used for delaying the audio signals produced from the subwoofer based on the installed position of the subwoofer or the relationship with other speakers.

7. PHASE: This is a mode for setting the inversion or non-inversion of the phase of the output audio signals.

8. AMP ID: This is a mode for setting the identification (ID) number for each amplifier when using a plurality of same amplifiers. A similar adjustment can be done by connecting each amplifier to a remote commander that can be purchased separately, where the ID numbers are used to select which amplifier to adjust in such an arrangement.

9. SAFE MODE: This is a mode for setting the first mode (SAFE MODE ON) or the second mode (SAFE MODE OFF).

10. MEMORY: This is a mode for writing and reading various set values that are preset in a memory. The last conditions are stored separately in the memory.

Figure 5:
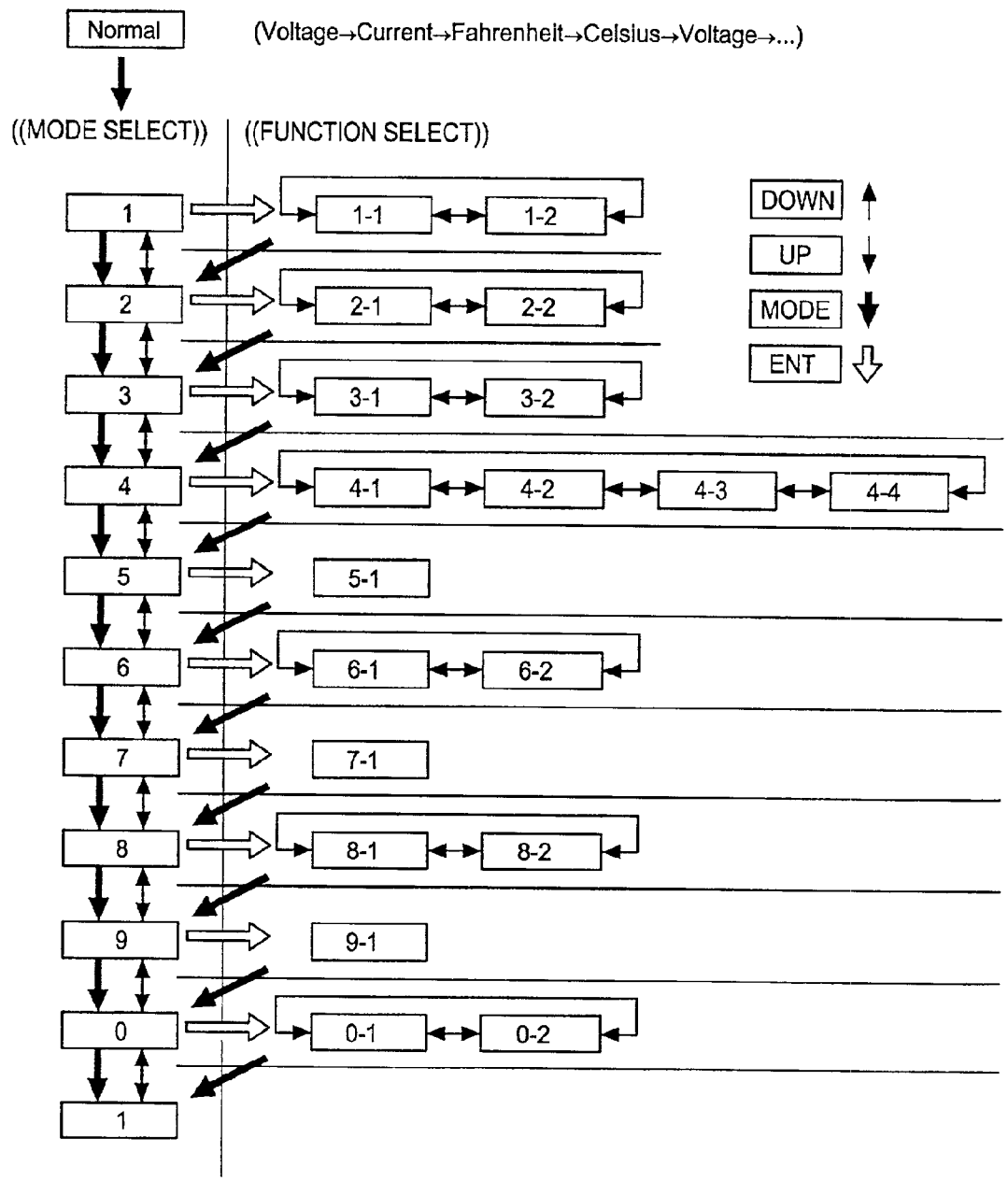
FIG. 5 is a diagram showing the mode transition with respect to the compensation functions in the automobile power amplifier of the present invention.

FIG. 5 shows an example of mode transition in the compensation functions of the vehicle power amplifier of the present invention. After the initial setting, or the completion of the compensation function settings, the power amplifier becomes a normal condition. The display 32 shows the source voltage, and every time the display key (DISP) is pressed, the display 32 sequentially indicates the values of voltage, current, temperature (Fahrenheit, Celsius), and voltage . . . , repeatedly in that order.

In the normal condition, upon pressing the mode key (MODE), the power amplifier changes to the mode 1 (INPUT MODE). In the mode 1, the enter key (ENT) allows the mode to select the functions between the first and second functions. The up and down key selects either the first function or the second function (input channel selection or gain function), and after the selection, conducts an input channel switching or gain control by a predetermined operation.

Then, the mode is changed to the mode 2 (LPF) upon operating the mode key (MODE) again, where the on/off of the low pass filter (LPF) as well as the upper limit frequency of the LPF are set. In a similar manner, the on/off settings of the other compensation functions and the adjustment values of the compensation function are set for the ten modes (mode 0 to mode 9). The mode returns to the mode 1 upon entering the mode key (MODE) at the mode 0. In any mode setting, the power amplifier returns to the normal condition upon pressing the display key (DISP). In the example of FIG. 5, the black arrows indicate the MODE key operation, the white arrows indicate the enter key (ENT) operation, and the thin line arrows indicate the up and down key operation.

In the initial setting at the shipment from the manufacturer, the microcomputer 3b confirms that nothing is written in the memory EEPROM 3d, and sets all functions to default settings. The microcomputer 3b then writes the information indicating the first mode (SAFE MODE ON) in the EEPROM 3d. Consequently, after the shipment, when the power is supplied to the vehicle power amplifier, the power amplifier is set to the first mode (SAFE MODE ON).

Figure 6:
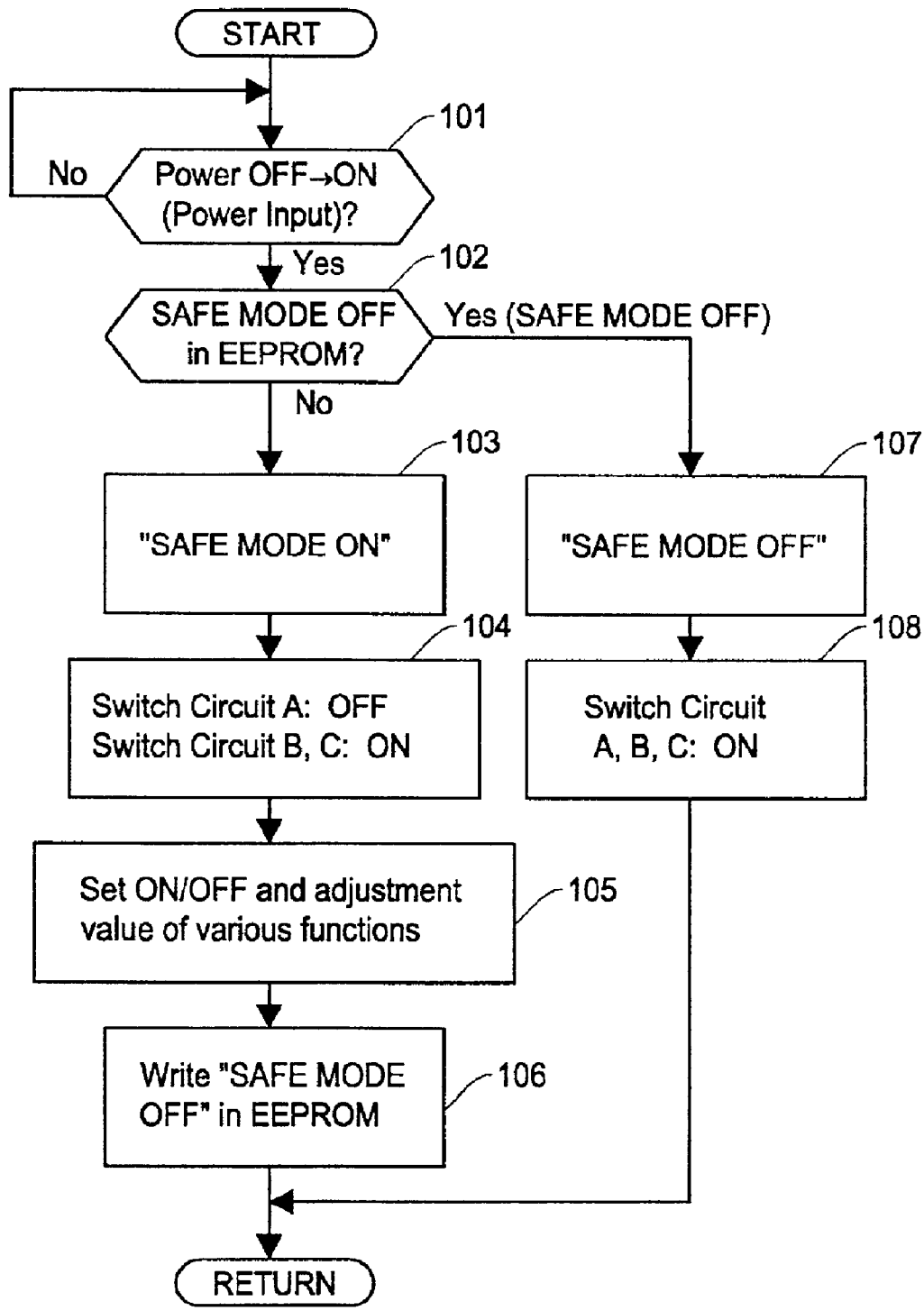
FIG. 6 is a flow diagram showing the control flow for supplying the power source to the vehicle power amplifier of the present invention.
Figure 7:
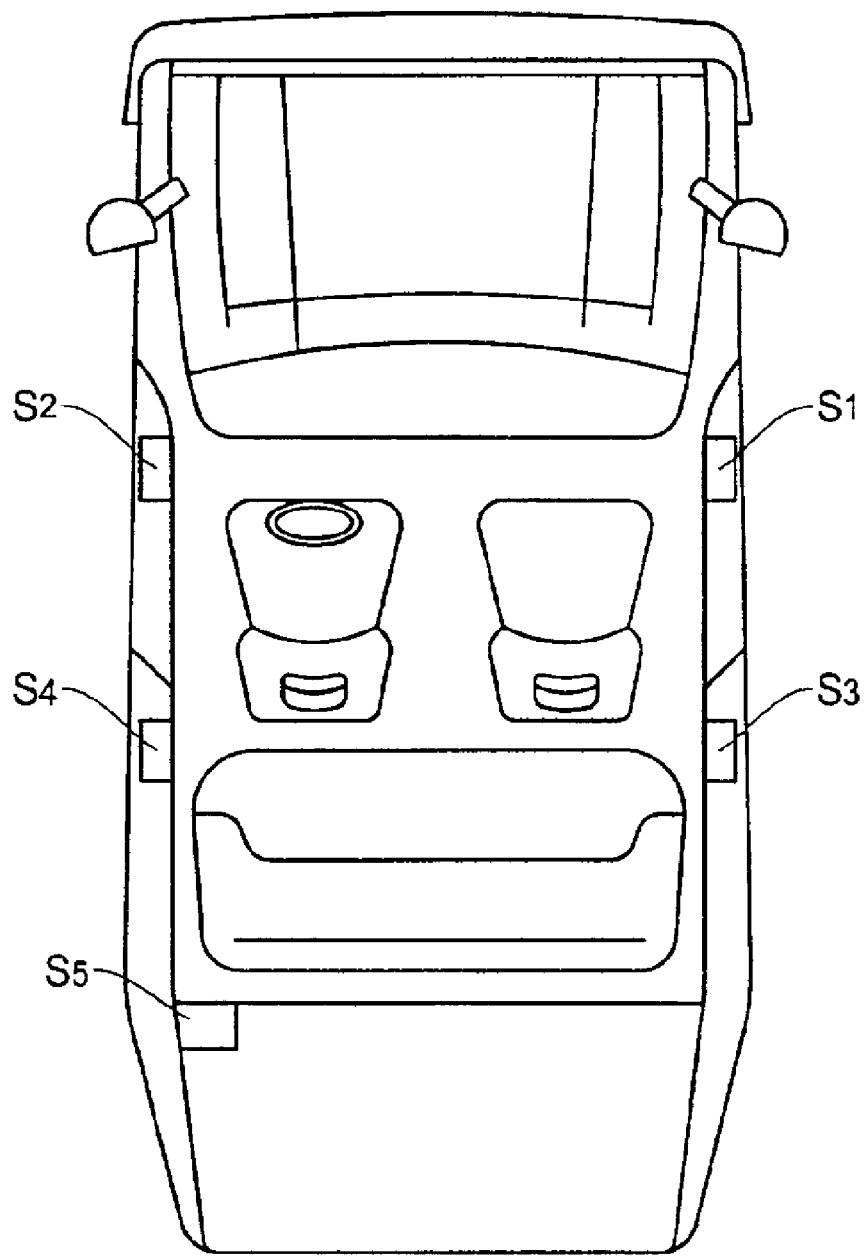
FIG. 7 is a diagram showing an example of speaker arrangement in a sedan type vehicle.
Figure 8:
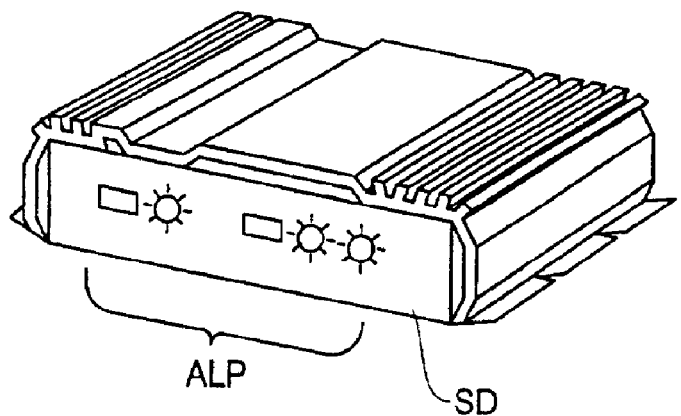
FIG. 8 is a perspective view showing an example of external view of the vehicle power amplifier in the conventional technology.

FIG. 6 is a flow chart showing the control process of voltage supply in the power amplifier of the present invention. For conducting the compensation function after the initial settings, the battery terminal +B is connected to the power source of small capacity and the power of the power amplifier is turned on (step 101). Then, the remote signal RMS rises to a high level, turning the switch circuit 42 on, where the DC voltage +5V from the constant voltage circuit 44 is supplied to the microcomputer 3b and the EEPROM 3d. The microcomputer 3b checks whether the EEPROM 3d stores information on the first mode (SAFE MODE ON) or the second mode (SAFE MODE OFF) (step 102).

Since the EEPROM 3d stores the first mode (SAFE MODE ON) as the initial mode setting, the microcomputer 3b confirms the first mode (step 103) and instructs the switch circuit 41 to turn off and the switch circuit 43 to turn on (step 104). Consequently, the constant voltage circuit 45 supplies the DC voltage +5V to the DSP 3a and the control panel 3c. However, since the switch circuit 41 is off, the main power circuit 2b remains inactive. Thus, in the first mode (SAFE MODE ON), the source voltage is supplied only to the adjustment and compensation controller 3 but not to the digital amplifier 2a. During the first mode, the current consumption is, for example, less than 100 mA, and the power consumption is, for example, less than 1 W.

In the first mode, the on/off operations of the various compensation functions and the associated adjustment values are set by operating the control panel 3c, and the resultant setting data is stored in the EEPROM 3d (step 105). Upon completing the settings of the various functions, the information indicating the second mode (SAFE MODE OFF) is stored in the EEPROM 3d through the mode 9 (step 106).

Then, the power is turned off and the small capacity power source is disconnected from the vehicle power amplifier. The vehicle power amplifier is installed in the vehicle. Under this condition, the vehicle battery provides the power to the power amplifier (step 101). As a consequence, the remote signal RMS rises to a high level, turning the switch circuit 42 on, where the DC voltage +5V from the constant voltage circuit 44 is supplied to the microcomputer 3b and the EEPROM 3d. The microcomputer 3b checks whether the EEPROM 3d stores the information on the first mode (SAFE MODE ON) or the second mode (SAFE MODE OFF) (step 102).

Since the EEPROM 3d stores the data indicating the second mode (SAFE MODE OFF), the microcomputer 3b confirms the second mode (step 107) and instructs the switch circuits 41 and 43 to turn on (step 108). When the switch circuit 43 is turned on, the constant voltage circuit 45 supplies the DC voltage +5V to the DSP 3a and the control panel 3c. Also, when the switch circuit 41 is turned on, the main power circuit 2b is activated. Accordingly, the main power circuit 2b generates the DC voltage ±22V by using the battery power, which is provided to the digital amplifier 2a and the constant voltage circuit 2c. The constant voltage circuit 2c then generates the DC voltage ±10V and provides the voltage to the input amplifier 5.

Thus, in the second mode (SAFE MODE OFF), source voltages are supplied to the entire power amplifier, allowing the whole system to operate. As a result, the audio signals supplied from a tuner or CD player through the audio input terminal AIN (FIG. 2) are amplified by the input amplifier 5 and provided to the DSP 3a. The DSP 3a applies the audio compensation process to the audio signals based on the values set for various compensation functions, and provides the resultant audio signals to the digital amplifier 2a. The digital amplifier 2a then amplifies the audio signals and provides them to the subwoofer 1.

As has been foregoing, according to the present invention, various compensation functions can be set and adjusted by connecting the vehicle power amplifier to a power source of small capacity before installing in the vehicle.

Further, since the power is supplied to the entire power amplifier only after the completion of the setting and adjustment of each compensation function, a high sound volume will not be reproduced at the power on, thus, it is able to protect apparatus and people in the vehicle.

Moreover, by establishing the first mode for supplying the power only to the adjustment unit and the display (SAFE MODE ON) and the second mode for supplying the power to the entire vehicle power amplifier (SAFE MODE OFF), the setting and adjustment of the audio property of the power amplifier can be completed safely and accurately prior to the installment in the vehicle.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A voltage supply device for a vehicle power amplifier having an audio characteristics compensation function, comprising:

means for setting the voltage supply device to a first mode when a device power is turned on;

means for setting the voltage supply device to a second mode when the device power is tuned on after setting on/off operation of compensation functions and associated adjustment values in the first mode and turning the power off; and a memory for storing information that determines either the first mode or the second mode when the device power is turned on;

wherein the first mode is a mode to supply source voltage only to a unit involved in setting the compensation functions and adjustment values, and the second mode is a mode to supply source voltages to the entire vehicle power amplifier, and wherein said setting means sets the voltage supply device to either the first mode or the second mode based on the information in the memory.

2. A voltage supply device as defined in claim 1, further comprising means for storing the information indicating the first mode in the memory at an initial stage before shipment of the voltage supply device, and means for storing the information indicating the second mode in the memory at the end of the first mode.

3. A vehicle power amplifier having an audio characteristics compensation function, comprising:

a memory for storing information which specifies either a first mode or a second mode at power on;

means for storing the information indicating the first mode in the memory before shipment of the vehicle power amplifier;

a voltage supply for supplying source voltages to blocks in the vehicle power amplifier based on the information stored in the memory;

means for setting on/off operation of compensation functions and associated adjustment values in the first mode and storing the information indicating the second mode in the memory after the setting, and means for applying a compensation process to input audio signals based on said setting and amplifying the audio signals by a power amplifier unit when the vehicle amplifier is in the second mode;

wherein the first mode is a mode to supply the source voltages only to blocks involved in setting the compensation functions and adjustment values, and the second mode is a mode to supply the source voltages to the entire vehicle power amplifier.

4. A vehicle power amplifier as defined in claim 3, wherein said memory is a non-volatile memory.

5. A vehicle power amplifier having an audio characteristics compensation function, comprising:

an adjustment and compensation controller for applying the audio characteristics compensation function to an input audio signal, the adjustment and compensation controller including a microcomputer for controlling an overall operation of the vehicle power amplifier;

a voltage supply for supplying source voltages to blocks in the vehicle power amplifier;

a memory for storing information which specifies either a first mode or a second mode at power on where the first mode is a mode to supply the source voltages only to blocks involved in setting the compensation functions and adjustment values, and the second mode is a mode to supply the source voltages to the entire vehicle power amplifier; and a power amplifier unit for amplifying the audio signal from the adjustment and compensation controller and supplies the resultant audio signal to a speaker;

wherein the microcomputer causes to store the information indicating the first mode in the memory before shipment of the vehicle power amplifier and the information indicating the second mode in the memory after setting on/off operation of compensation functions and associated adjustment values in the first mode.

6. A vehicle power amplifier as defined in claim 5, wherein said adjustment and compensation controller includes a digital signal processor which applies a compensation process to the audio signals in the second mode based on said setting made in the first mode.

7. A vehicle power amplifier as defined in claim 6, wherein said digital signal processor applies the compensation process to the audio signals in the second mode by connecting a large capacity power source to the vehicle power amplifier after installing the vehicle power amplifier in a vehicle.

8. A vehicle power amplifier as defined in claim 5, wherein a procedure for setting the on/off operation of compensation functions and associated adjustment values in the first mode is conducted by connecting a small capacity power source to the vehicle power amplifier before installing the vehicle power amplifier in a vehicle.

9. A vehicle power amplifier as defined in claim 5, wherein said memory is a non-volatile memory.

* * * * *